United States Patent

Senshu et al.

(10) Patent No.: US 7,457,227 B2
(45) Date of Patent: Nov. 25, 2008

(54) OPTICAL DISC

(75) Inventors: Susumu Senshu, Kanagawa (JP); Yuji Akiyama, Tokyo (JP)

(73) Assignee: Sony Corporation, Tokyo (JP)

( * ) Notice: Subject to any disclaimer, the term of this patent is extended or adjusted under 35 U.S.C. 154(b) by 942 days.

(21) Appl. No.: 10/902,846

(22) Filed: Aug. 2, 2004

(65) Prior Publication Data

US 2005/0052985 A1 Mar. 10, 2005

(30) Foreign Application Priority Data

Aug. 6, 2003 (JP) ............................. 2003-287391

(51) Int. Cl.
*G11B 3/70* (2006.01)
(52) U.S. Cl. ............................ 369/273; 369/14; 369/94
(58) Field of Classification Search ................ 369/273, 369/14, 94, 275.1–275.5; 428/64.4; 340/10.1, 340/568.1
See application file for complete search history.

(56) References Cited

U.S. PATENT DOCUMENTS

2006/0010463 A1 * 1/2006 Oshima et al. ............... 720/718
2007/0171772 A1 * 7/2007 Oshima et al. ................ 369/14

FOREIGN PATENT DOCUMENTS

JP 2001-210057 * 8/2001

* cited by examiner

*Primary Examiner*—Ali Neyzari
(74) *Attorney, Agent, or Firm*—Oblon, Spivak, McClelland, Maier & Neustadt, P.C.

(57) ABSTRACT

An optical disc includes a base having a signal reading surface at a first surface; a reflective layer provided on the signal reading surface of the base; a cover layer provided on the reflective layer; and a small memory device having a communication function provided at a side opposing the signal reading surface of the base.

11 Claims, 10 Drawing Sheets

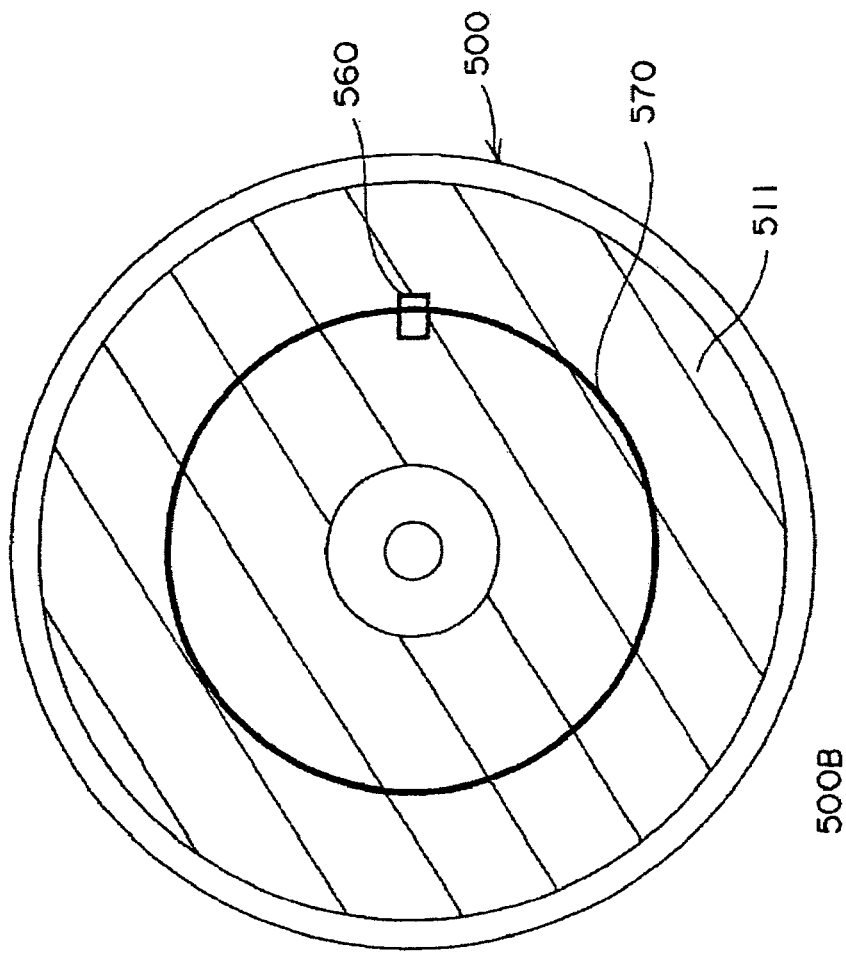
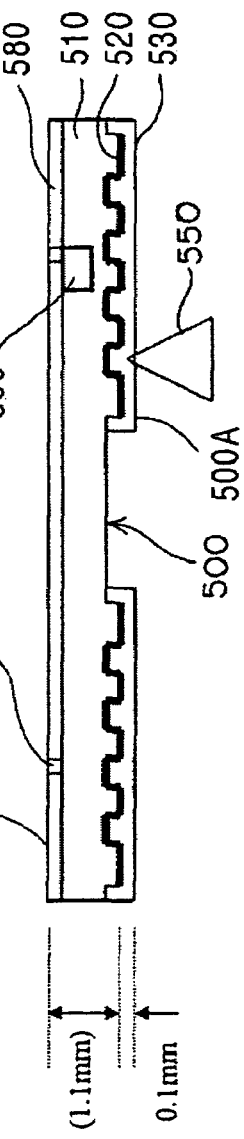
FIG. 4A
FIG. 4B

OPTICAL DISC

BACKGROUND OF THE INVENTION

1. Field of the Invention

The present invention relates to an optical disc having a minute integrated circuit (IC) memory chip, called an IC tag or an RF tag, which stores a variety of readable data and which has a radio communication function.

2. Description of the Related Art

In recent years, various minute IC memory chips having radio communication functions have been put to practical use. Optical discs, such as compact discs (CDs) or digital versatile disks (DVDs), each having such a minute IC memory chip and an antenna coil, have been proposed. A variety of management data, which is stored in the minute IC memory chip, is applied to various purposes.

In the applications of such a minute IC memory chip, for example, a unique identification (ID) provided for the disc is helpful to management of the disc or prevention of theft of the disc. Providing the disc with a writable memory that can record a variety of information allows accounting or right information of content, data, or files to be stored. In addition, provision of a private key permits authentication by, for example, public key infrastructure (PKI) in a processing circuit including a CPU to provide a decryption key of encrypted content, data, or files only to a legal party or to provide a security function, for example, to allow the accounting or right information to be updated.

Accordingly, since the information stored in such an IC memory chip cannot easily correspond to the data or content in the optical disc if the information in the IC memory chip is separated from the optical disc, it is preferable that the IC memory chip be integrated with the optical disc.

A known CD on which such a minute IC memory chip is integrally mounted is disclosed in Japanese Unexamined Patent Application Publication No. 2001-210057.

FIG. 7A is a plan view showing the structure of a known CD and FIG. 7B is a cross-sectional view of the CD in FIG. 7A. FIG. 8A is a plan view showing the structure of the CD shown in FIGS. 7A and 7B, which has an IC memory chip and an antenna coil mounted thereon. FIG. 8B is a cross-sectional view of the CD in FIG. 8A.

Referring to FIGS. 7A and 7B, a CD 100 has a transparent base 110 made of, for example, polycarbonate, a signal recording surface 111 that is a series of pits, and a reflective film 120 made of aluminum or the like. The signal recording surface 111 is formed on the top surface of the base 110 and the reflective film 120 is formed on the signal recording surface 111. A protective film 130 made of a resin is formed on the reflective film 120.

A center portion 140 to which a disk chuck (not shown) fits is provided around the center of the CD 100. The overall thickness of the CD 100 is defined to be a value around 1.2 mm.

The CD 100 is irradiated with a light beam 160 from the transparent base 110 side. Signals on the series of pits are read by the light reflected from the reflective film 120.

In the CD 100, it is difficult to provide the IC memory chip and the antenna coil described above in a recording area in the transparent base 110 through which the light beam is transmitted. In addition, since the reflective film 120 and the protective film 130 have a small thickness, it is also difficult to embed the IC memory chip and the antenna coil in these films. Hence, the IC memory chip and the antenna coil are provided, for example, on a surface opposing a reproducing surface for the disc in the center portion 140, as shown in FIGS. 8A and 8B. That is, referring to FIGS. 8A and 8B, a minute IC memory chip 170 is provided on the surface opposing the reproducing surface for the disc in the center portion 140, and an antenna coil 180 is annularly provided along the inside perimeter of the center portion 140. The antenna coil 180 passes through the minute IC memory chip 170. The bottom surface of the CD 100 serves as a reproducing surface 100A for the disc and the top surface of the CD 100 serves as a reproducing surface 100B for the chip.

A known DVD on which such a minute IC memory chip is integrally mounted is disclosed in Japanese Unexamined Patent Application Publication No. 9-245381.

FIG. 9A is a plan view showing the structure of a known DVD and FIG. 9B is a cross-sectional view of the DVD in FIG. 9A. FIG. 10A is a plan view showing the structure of the DVD shown in FIGS. 9A and 9B, which has an IC memory chip and an antenna coil mounted thereon. FIG. 10B is a cross-sectional view of the DVD in FIG. 10A.

Referring to FIG. 9B, a DVD 200 has two transparent bases 210 and 220 made of, for example, polycarbonate and an adhesive layer 230 made of an adhesive resin, which is sandwiched between the transparent bases 210 and 220. Signal recording surfaces 211 and 221 each being a series of pits are formed inside the transparent bases 210 and 220, respectively. A reflective film 240 made of aluminum or the like is formed on the signal recording surface 211 and a reflective film 250 made of aluminum or the like is formed on the signal recording surface 221.

The overall thickness of the DVD 200 is defined to be a value around 1.2 mm.

The DVD 200 is irradiated with a light beam 280 from both the transparent base 210 side and the transparent base 220 side. Signals on the series of pits are read by the light reflected from the reflective films 240 and 250.

It is difficult to provide the IC memory chip and the antenna coil described above in a recording area of information in the DVD 200 and the DVD 200 has no center portion, unlike the CD 100 shown in FIGS. 7A and 7B. Hence, for example, as shown in FIGS. 10A and 10B, a minute IC memory chip 290 and an antenna coil 300 are embedded in the joint of the transparent bases 210 and 220 at the center of the DVD 200. That is, the minute IC memory chip 290 is provided near the center portion of the DVD 200 and the antenna coil 300 is annularly provided so as to be concentric with the DVD 200. The antenna coil 300 passes through the minute IC memory chip 290.

The bottom surface of the DVD 200 serves as a reproducing surface 200A for the disc and the top surface of the DVD 200 serves as a reproducing surface 200B for the chip in FIG. 10B.

As described above, in known optical discs, the IC memory chip or the antenna coil must be selectively provided in a limited area in view of the relationship with a light transmission area or conditions of the film thickness. Hence, known optical discs are likely to have restrictions on the size of elements or functions thereof and they have disadvantages in their design and manufacturing.

SUMMARY OF THE INVENTION

It is an object of the present invention to provide an optical disc capable of allocating a large area to a small memory device having a communication function, which is called an IC tag or an RF tag, and of being easily designed or manufactured to improve its function.

In order to achieve the above object, the present invention provides an optical disc including a base having a signal reading surface at a first surface; a reflective layer provided on the signal reading surface of the base; a cover layer provided on the reflective layer; and a small memory device having a communication function provided at a side opposing the signal reading surface of the base.

The optical disc according to the present invention has a structure in which the reflective layer and the cover layer are provided at the side of the signal reading surface of the base to read signals. Providing the small memory device having a communication function at a side opposing the signal reading surface of the base allows a large area to be allocated to the small memory device having a communication function regardless of the range of the recording area, thus easily designing and manufacturing the optical disc and also improving the function thereof.

BRIEF DESCRIPTION OF THE DRAWINGS

FIG. 4A is a plan view showing the structure of an optical disc (BD) according to a third embodiment of the present invention;

FIG. 4B is a cross-sectional view of the optical disc (BD) of the third embodiment;

DESCRIPTION OF THE PREFERRED EMBODIMENTS

Embodiments of the present invention provide optical discs, for example, Blu-ray discs (BDs), each having an IC memory chip and an antenna coil, which constitute a small memory device having a communication function, on or inside a base at a side opposing an optical reading surface. Since such an optical disc has the optical reading surface at the side of a cover layer, an IC memory chip and an antenna coil can be provided in a wide area at the side of a base.

The base of, for example, a BD has a thickness of 1.1 mm and serves as a foundation. Hence, the base can be subject to processing to freely provide an IC memory chip and an antenna coil on its surface or inside the base as long as specifications including the disc thickness or weight are satisfied.

The optical disc may be structured such that the IC memory chip and the antenna coil are provided in a label that is adhered to the cover layer of the optical disc.

First Embodiment

Figure 1A:
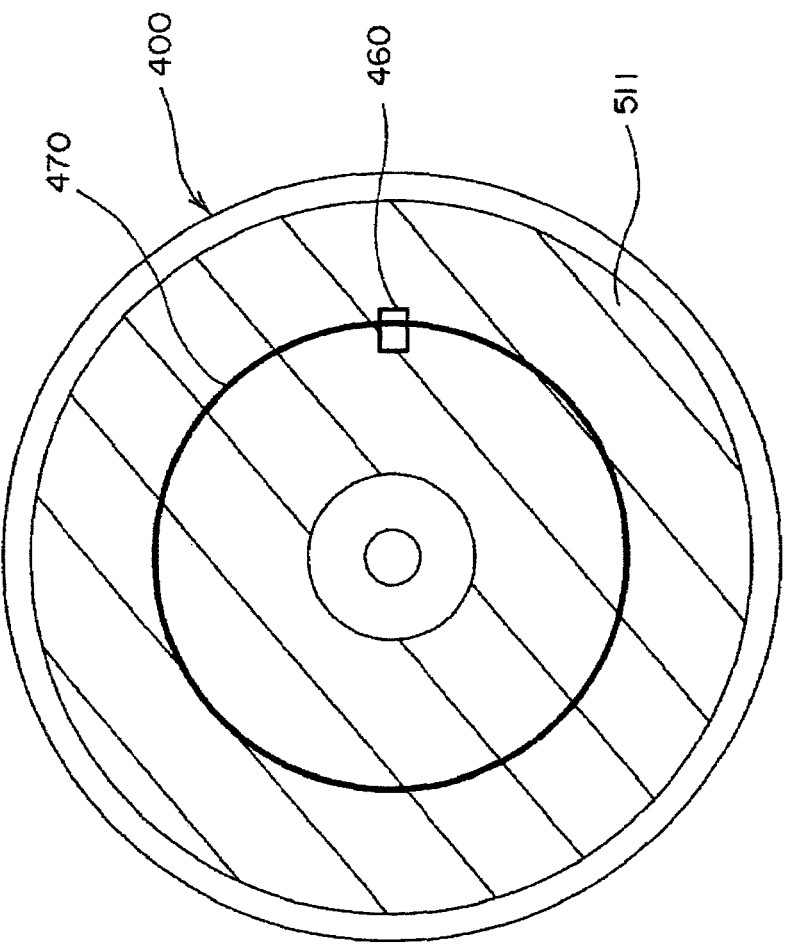
FIG. 1A is a plan view showing the structure of an optical disc (Blu-ray disc (BD)) according to a first embodiment of the present invention.
Figure 1B:
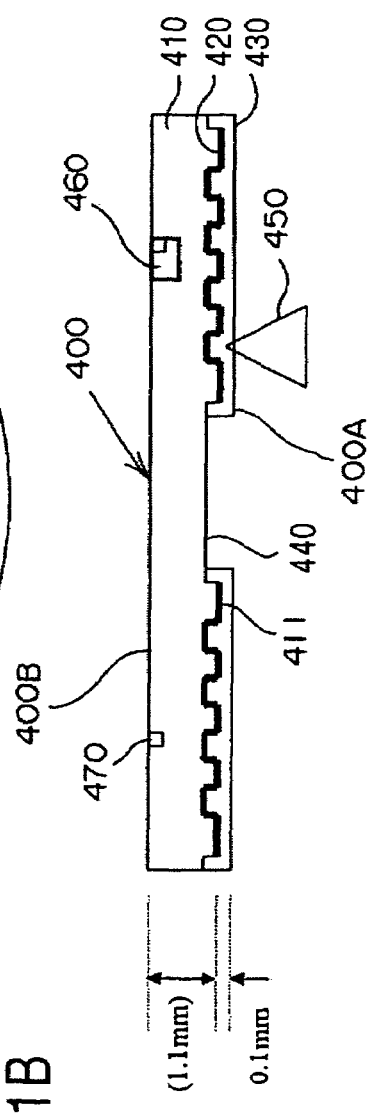
FIG. 1B is a cross-sectional view of the optical disc (BD) of the first embodiment.

FIG. 1A is a plan view showing the structure of a Blu-ray disc (BD) having an IC memory chip and an antenna coil according to a first embodiment of the present invention. FIG. 1B is a cross-sectional view of the BD.

Referring to FIGS. 1A and 1B, a BD 400 of the first embodiment has a base 410 made of, for example, polycarbonate, a signal recording surface 411 that is a series of pits, and a reflective film 420 that is a layer made of aluminum. The signal recording surface 411 is formed on the bottom surface (first surface) of the base 410 and the reflective film 420 is formed on the signal recording surface 411. A cover layer 430 made of a transparent resin is formed on the reflective film 420.

A center portion 440 to which a disk chuck (not shown) fits is provided around the center of the BD 400. The overall thickness of the BD 400 is defined to be a value around 1.2 mm. The base 410 has a thickness of 1.1 mm and the cover layer 430 has a thickness of 0.1 mm.

The BD 400 is irradiated with a light beam 450 from the cover layer 430 side. Signals on the series of pits are read by the light reflected from the reflective film 420.

In the BD 400, a minute IC memory chip 460 and an antenna coil 470 connected to the minute IC memory chip 460, which constitute a small memory device having a communication function, are embedded inside the top surface (second surface) of the base 410.

Accordingly, referring to FIG. 1B, the bottom surface (first surface) of the BD 400 serves as a reproducing surface 400A for the disc and the top surface (second surface) of the BD 400 serves as a reproducing surface 400B for the chip.

The minute IC memory chip 460 is provided in a back-surface area corresponding to a signal recording area on the signal recording surface 411. The antenna coil 470 is annularly provided so as to be concentric with the BD 400 and to have a radius approximately half of that of the BD 400. That is, the radius of the antenna coil 470 is greater than the radii of the known antenna coils shown in FIGS. 8A, 8B, 10A, and 10B, thus providing a higher communication function. Hence, the BD 400 of the first embodiment can provide a function sufficient to receive weak high-frequency signals or electromagnetic waves for electric power.

Although both the minute IC memory chip 460 and the antenna coil 470 are embedded inside the base 410 in the first embodiment, both or either of the minute IC memory chip 460 and the antenna coil 470 may be mounted on the base 410 within an allowable range of the patterned indented surface. In addition, the antenna coil 470 is not limited to a one-turn shape, as shown in FIG. 1A.

It is preferable that a small memory device having a communication function can read out information stored in a memory IC without using a disk drive. Since data on a disc is likely to be read out by a method of some kind, for example, by using an illegal disk drive, the disc must have sufficient security. That is, it is difficult to say that data recorded on a disc has high security. Accordingly, the small memory device of the first embodiment is structured so as to incorporate a memory that stores encrypted key information for protecting the information, a CPU for performing two-way authentication with external devices, and an analog circuit for communicating with external devices to obtain electric power required for the operation of the memory IC. The small memory device may be a device other than the memory IC as long as it has the structure described above.

There is no guarantee that the optical disc is included in a cartridge. It is unknown how disc chucking is performed (at which angle the disc chucking is performed) and the optical disc rotates in a device. Hence, the optical disc is provided with the antenna coil 470 in order to achieve non-contact communication with external devices and to obtain electric power required for the communication.

Second Embodiment

Figures 2A, 2B:
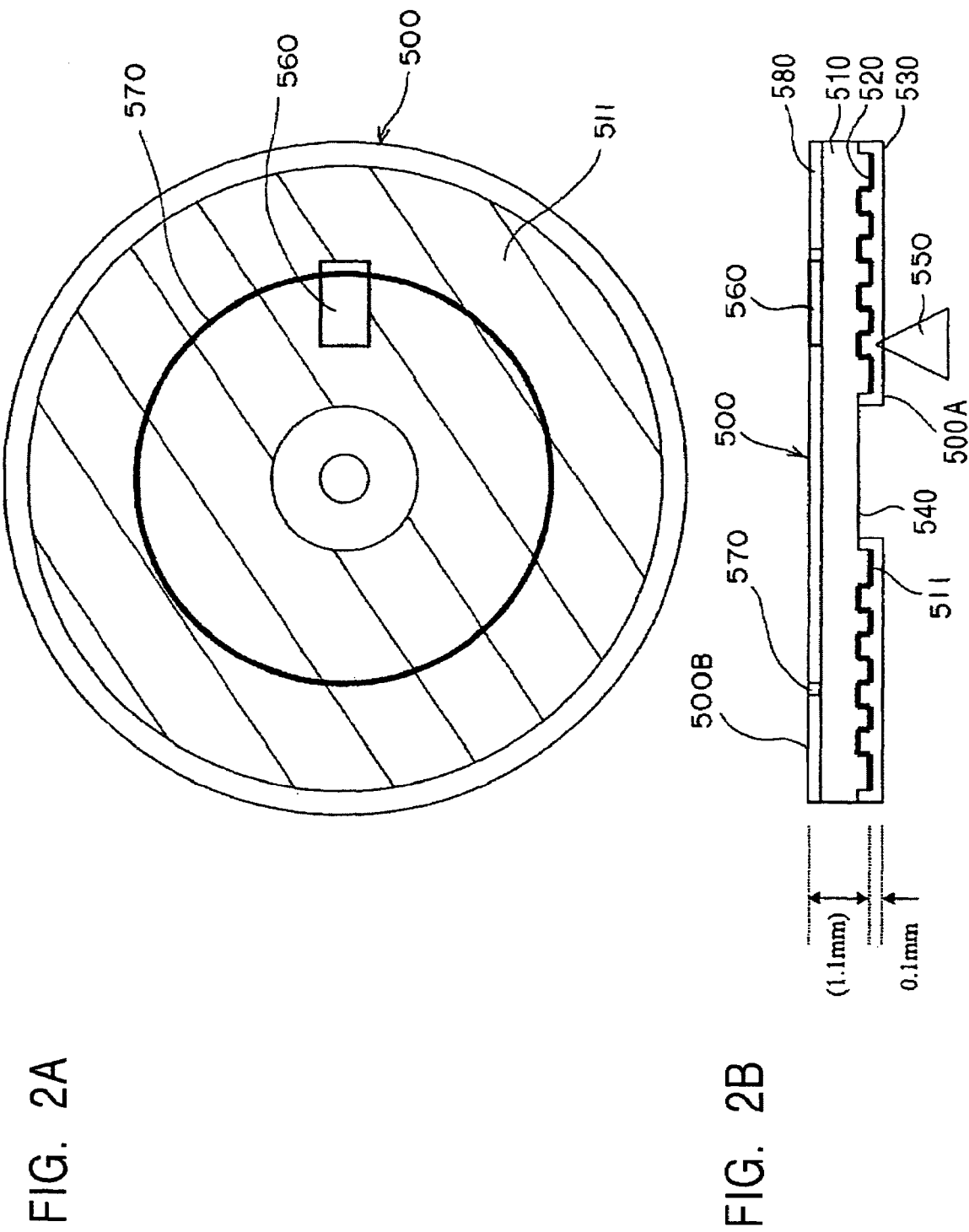
FIG. 2A is a plan view showing the structure of an optical disc (BD) according to a second embodiment of the present invention.
FIG. 2B is a cross-sectional view of the optical disc (BD) of the second embodiment.

FIG. 2A is a plan view showing the structure of a BD having an IC memory chip and an antenna coil according to a second embodiment of the present invention. FIG. 2B is a cross-sectional view of the BD.

Referring to FIGS. 2A and 2B, a BD 500 of the second embodiment has a base 510, a signal recording surface 511 that is a series of pits, and a reflective film 520 made of aluminum or the like, as in FIGS. 1A and 1B. The signal recording surface 511 is formed on the bottom surface (first surface) of the base 510 and the reflective film 520 is formed on the signal recording surface 511. A cover layer 530 made of a transparent resin is formed on the reflective film 520. A center portion 540 is provided around the center of the BD 500.

The BD 500 is irradiated with a light beam 550 from the cover layer 530 side. Signals on the series of pits are read by the light reflected from the reflective film 520.

In the BD 500, a label 580 made of a resin is adhered to the top surface (second surface) of the base 510. A minute IC memory chip 560 and an antenna coil 570 connected to the minute IC memory chip 560, which constitute a small memory device having a communication function, are sealed in the label 580.

Accordingly, referring to FIG. 2B, the bottom surface (first surface) of the BD 500 serves as a reproducing surface 500A for the disc and the top surface (second surface) of the BD 500 serves as a reproducing surface 500B for the chip.

The minute IC memory chip 560 in the label 580 is provided in a back-surface area corresponding to a signal recording area on the signal recording surface 511. The antenna coil 570 is annularly provided so as to be concentric with the BD 500 and to have a radius approximately half of that of the BD 500. That is, the radius of the antenna coil 570 is greater than the radii of the known antenna coils shown in FIGS. 8A, 8B, 10A, and 10B, as in FIGS. 1A and 1B, thus providing a higher communication function. Hence, the BD 500 of the second embodiment can provide a function sufficient to receive weak high-frequency signals or electromagnetic waves for electric power.

The thickness of the base 510 including the thickness of the label 580 is 1.1 mm, which is within the specifications.

Figure 3:
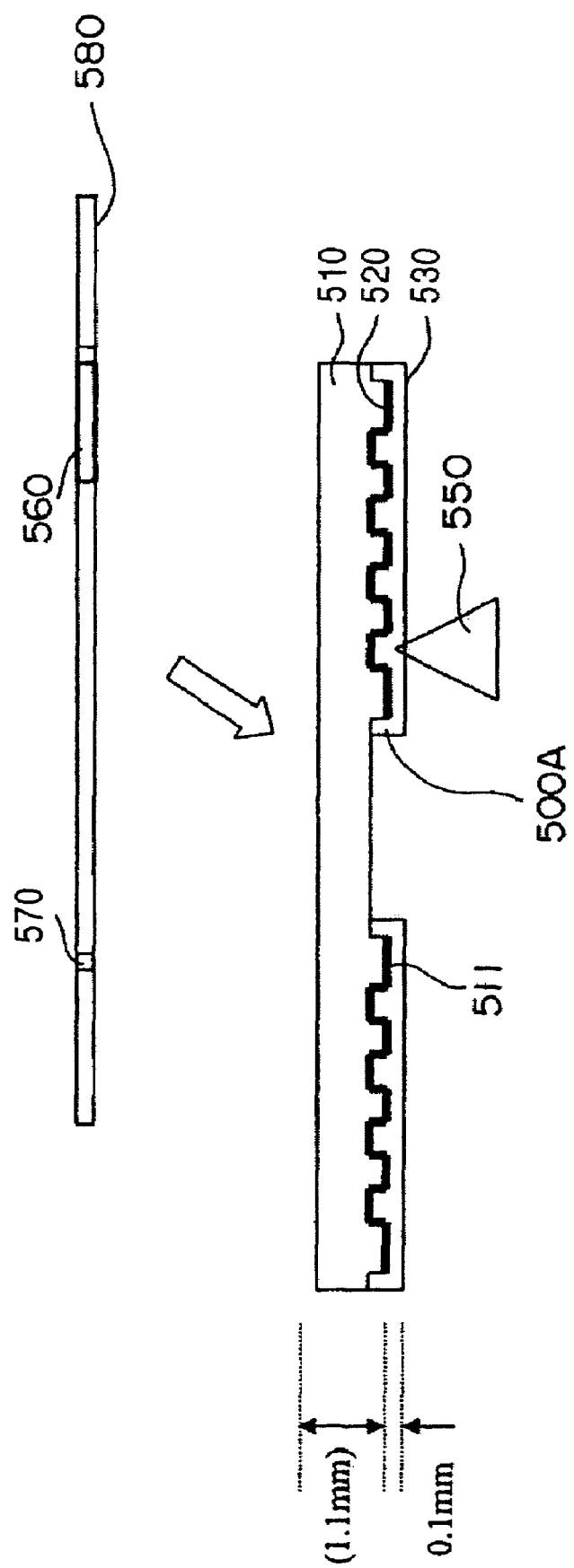
FIG. 3 is a cross-sectional view showing a manner in which a label is adhered to the base in the optical disc in FIGS. 2A and 2B.

FIG. 3 is a cross-sectional view showing a manner in which the label 580 having the sealed minute IC memory chip 560 and antenna coil 570 is adhered to the base 510. For example, the label 580 is adhered and fixed to the base 510 by using an adhesive or by thermal welding if the temperature conditions are satisfied.

Third Embodiment

Although both the minute IC memory chip 560 and the antenna coil 570 are provided in the label 580 in the second embodiment, one of them may be provided in the label 580 and the other one may be embedded inside the base 510. FIGS. 4A and 4B illustrate an example in which the minute IC memory chip 560 is embedded inside the base 510 and the antenna coil 570 is provided in the label 580 according to a third embodiment of the present invention. The same reference numerals are used in FIGS. 4A and 4B to identify the same components shown in FIGS. 2A and 2B. The description of such components is omitted here.

Fourth Embodiment

For example, in the BD 500 shown in FIGS. 2A and 2B, the radio communication through the antenna coil can malfunction due to the effect of the reflective film 520. Accordingly, a high-permeability sheet is effectively sandwiched between the label 580 and the base 510 to inhibit the effect of the reflective film 520 on the radio communication.

Figure 5:
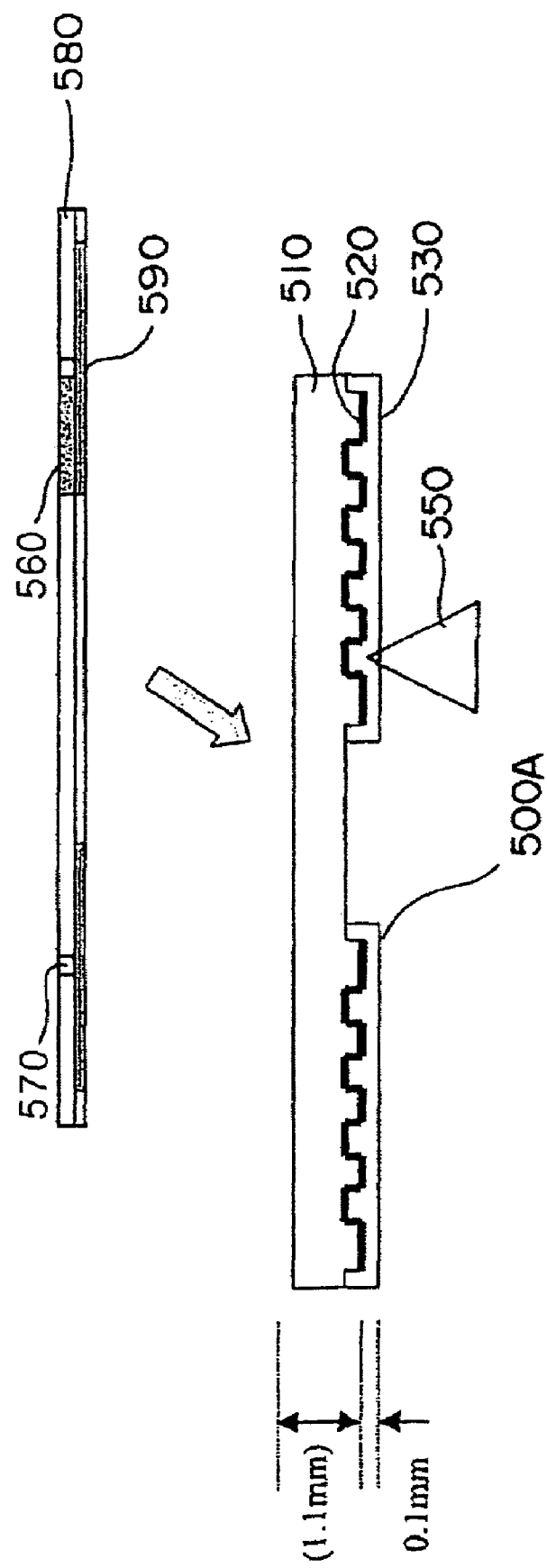
FIG. 5 illustrates an example of an optical disc (BD) according to a fourth embodiment of the present invention.

FIG. 5 illustrates an example of an optical disc according to a fourth embodiment of the present invention. Referring to FIG. 5, a high-permeability sheet 590 corresponding to the area of the antenna coil 570 is sandwiched between the label 580 and the base 510 to inhibit the effect of the reflective film 520 on the radio communication. The high-permeability sheet 590 is, for example, a thin film made of a composite material having soft magnetic powered plastics compounded at a predetermined ratio. In addition, providing an insulating layer (not shown) on the surface, in contact with the antenna coil 570, of the high-permeability sheet 590 can further improve the permeability. The same reference numerals are used in FIG. 5 to identify the same components shown in FIGS. 2A and 2B. The description of such components is omitted here.

Fifth Embodiment

Figure 6A:
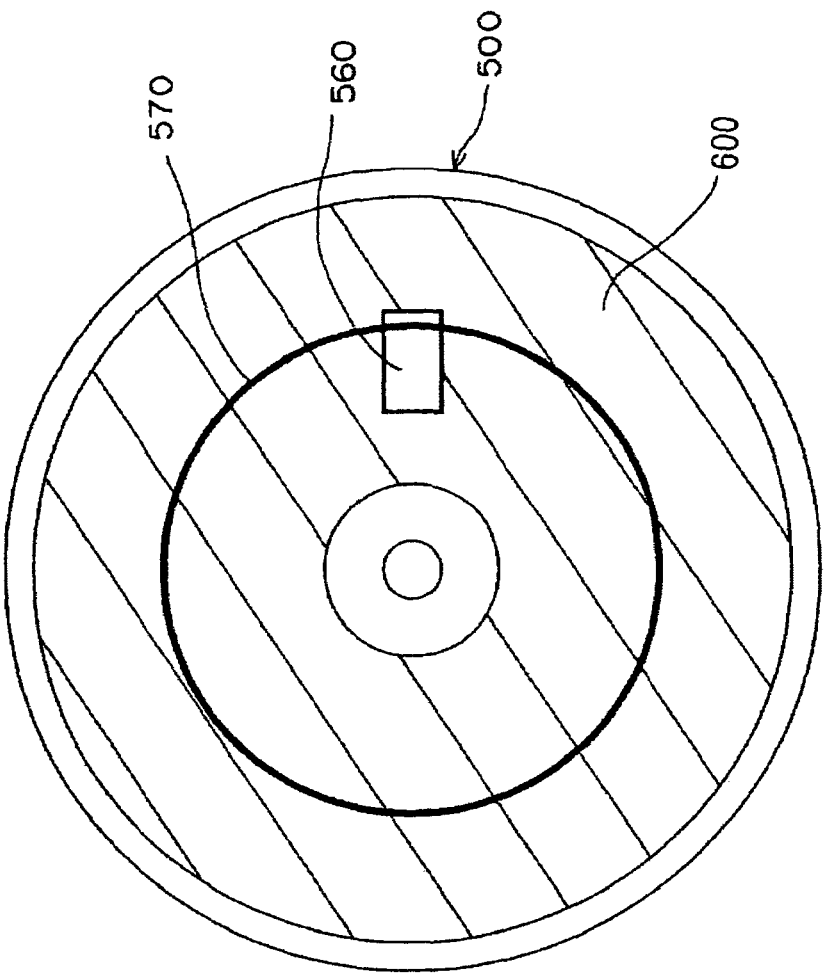
FIG. 6A is a plan view showing the structure of an optical disc (BD) according to a fifth embodiment of the present invention.
Figure 6B:
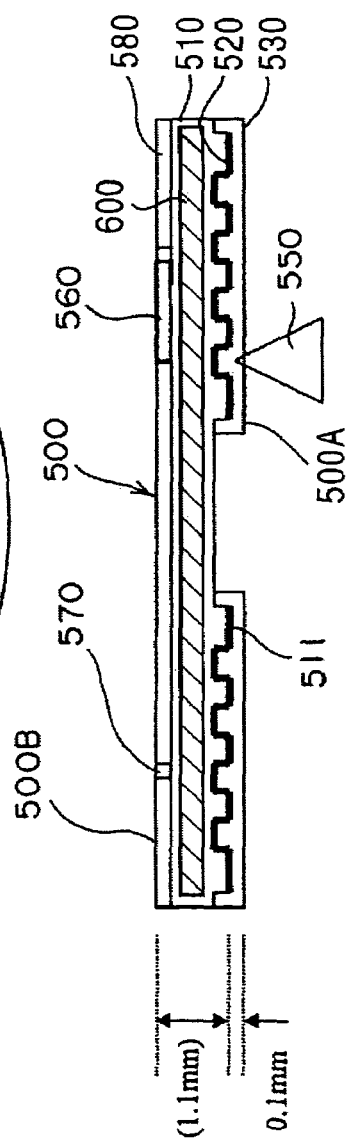
FIG. 6B is a cross-sectional view of the optical disc (BD) of the fifth embodiment.
Figure 7A:
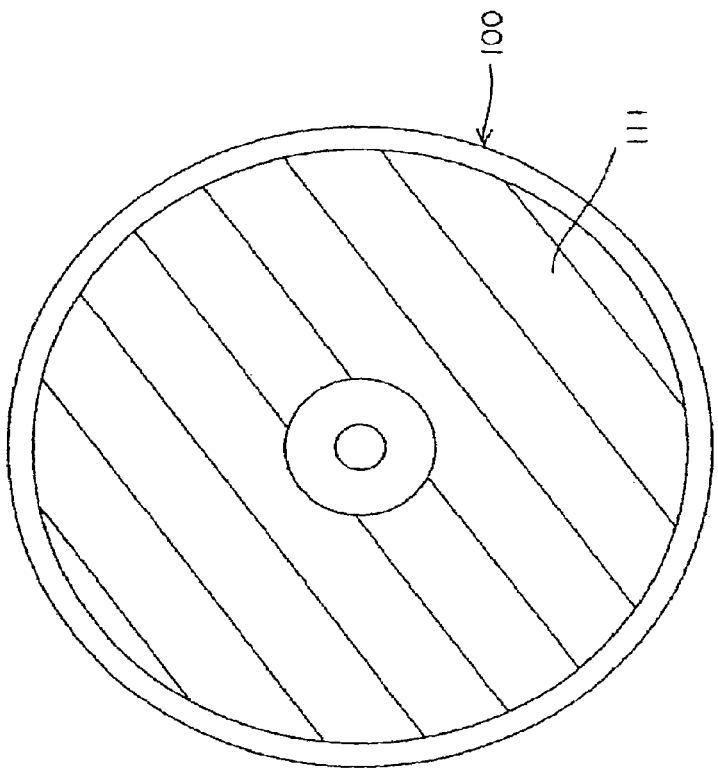
FIG. 7A is a plan view showing the structure of a known CD.
Figure 7B:
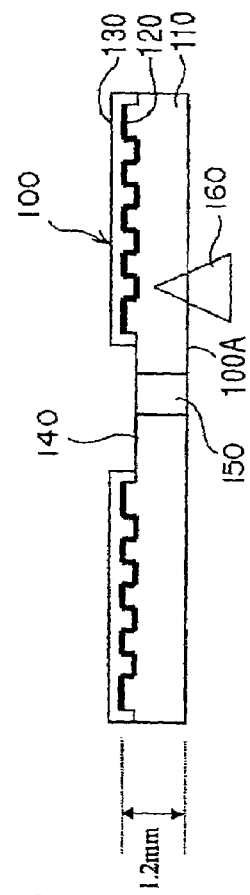
FIG. 7B is a cross-sectional view of the CD in FIG. 7A.
Figure 8A:
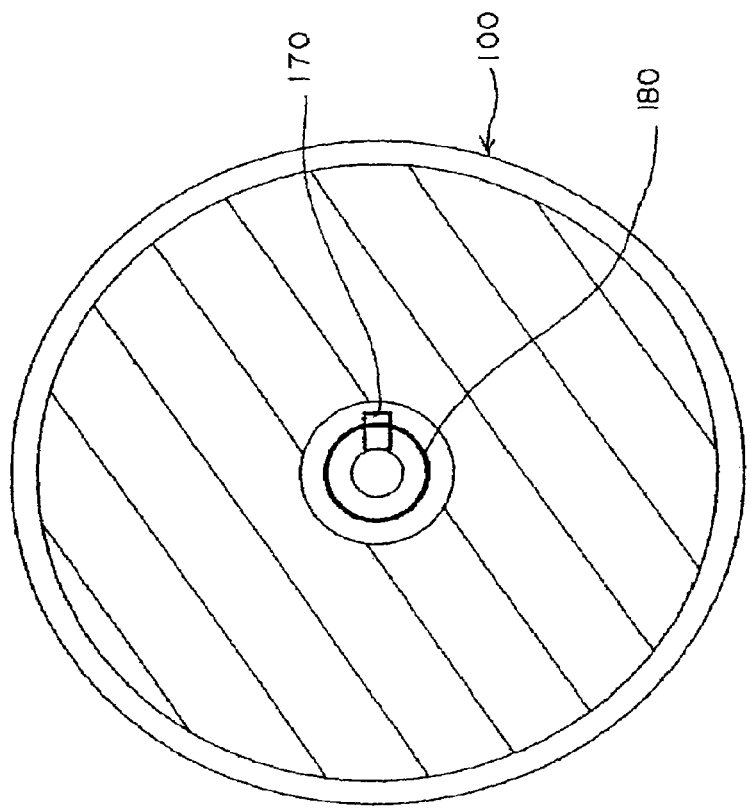
FIG. 8A is a plan view showing the structure of the CD shown in FIGS. 7A and 7B, which has an IC memory chip and an antenna coil mounted thereon.
Figure 8B:
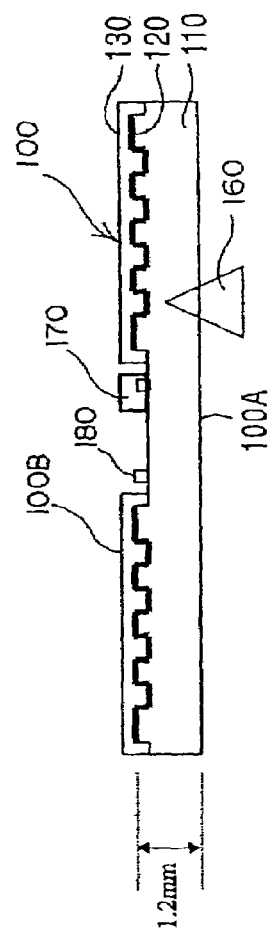
FIG. 8B is a cross-sectional view of the CD in FIG. 8A.
Figures 9A, 9B:
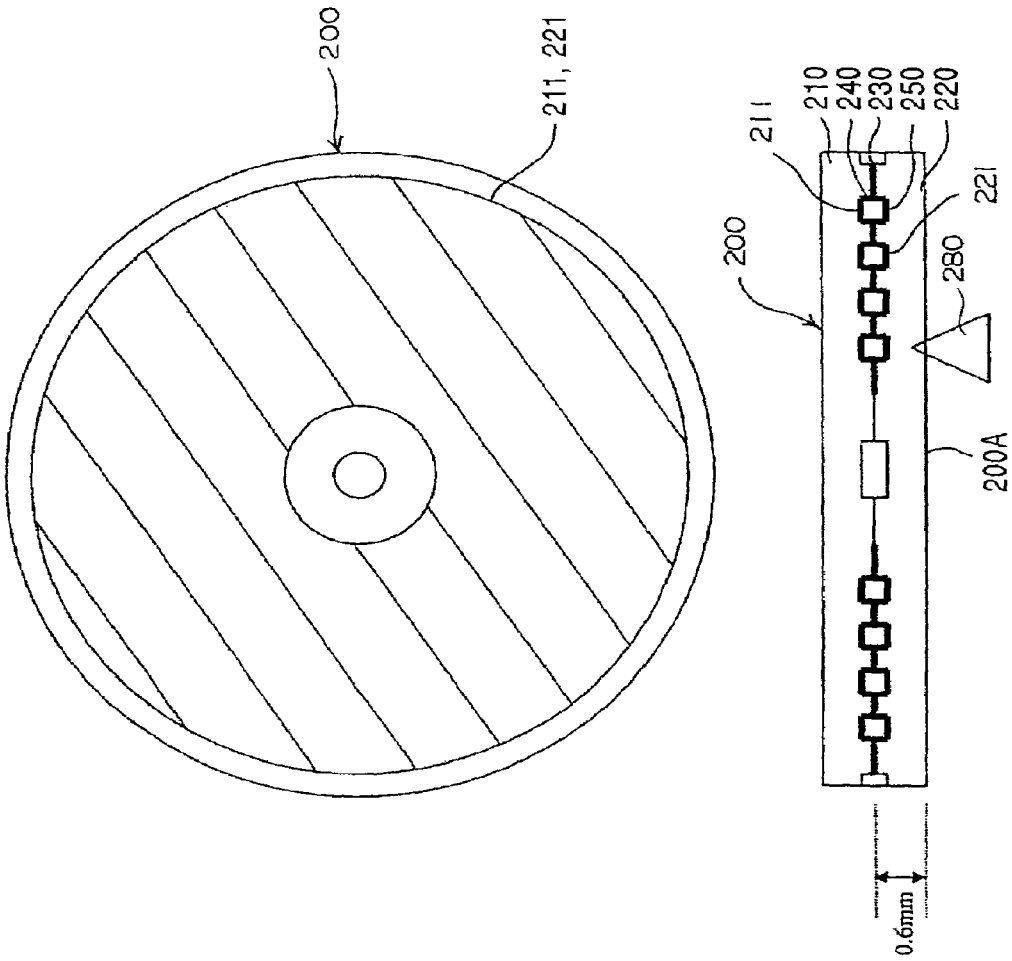
FIG. 9A is a plan view showing the structure of a known DVD.
FIG. 9B is a cross-sectional view of the DVD in FIG. 9A.
Figures 10A, 10B:
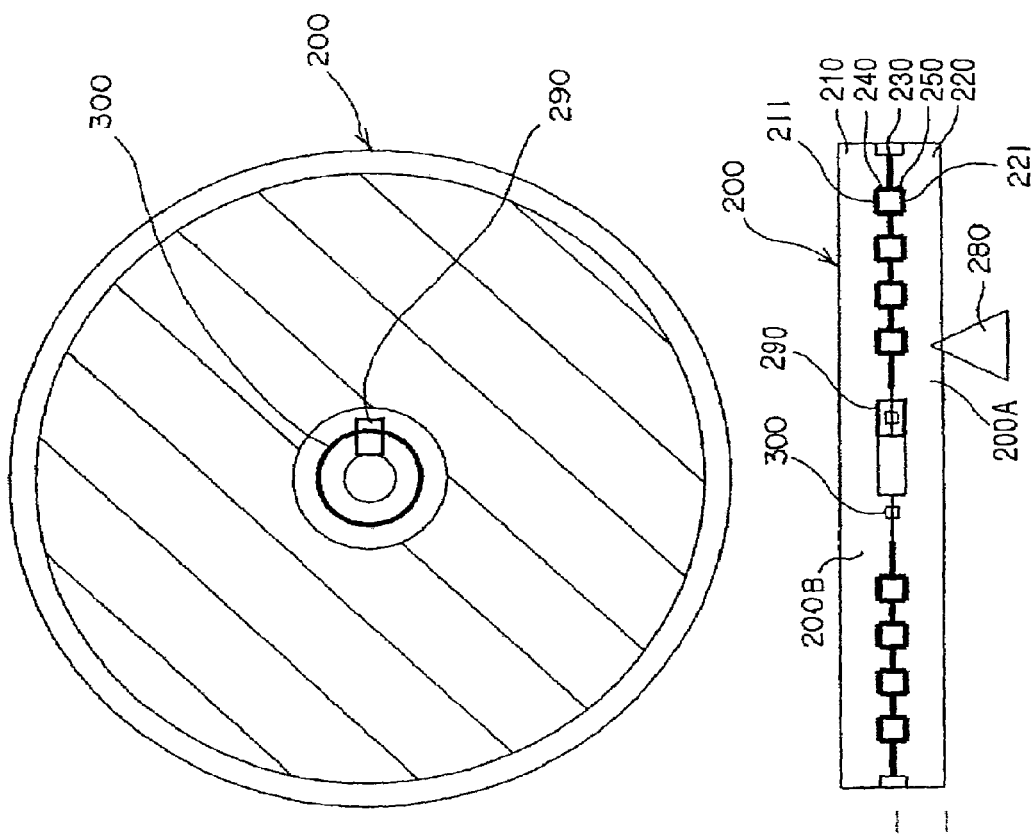
FIG. 10A is a plan view showing the structure of the DVD shown in FIGS. 9A and 9B, which has an IC memory chip and an antenna coil mounted thereon.
FIG. 10B is a cross-sectional view of the DVD in FIG. 10A.

FIG. 6A is a plan view showing the structure of an optical disc according to a fifth embodiment of the present invention. FIG. 6B is a cross-sectional view of the optical disc in FIG. 6A. Instead of using the high-permeability sheet 590 in FIG. 5, at least part of the base 510 is formed of a high-permeability material 600. For example, the base 510 is subject to two-color molding to fill the inner part of the base 510 made of a synthetic resin including polycarbonate with the high-permeability material 600. This method inhibits the effect of the reflective film 520 on the radio communication, as in the high-permeability sheet 590 shown in FIG. 5. Since the high-permeability material 600 is covered with polycarbonate, this polycarbonate film serves as an insulating layer between the high-permeability material 600 and the antenna coil 570. Furthermore, since a sheet material is not attached to the base 510 in the fifth embodiment, the sheet material cannot result in being detached from the base 510.

Although the BD is exemplified as an optical disc having the optical reading surface at the side of a cover layer, the present invention can be applied to other optical discs each having the optical reading surface at the side of the cover layer. Furthermore, the present invention is not limited to the read-only optical disc described above and can also be applied to a recordable optical disc. In this case, a reflective layer includes a recording layer (for example, the recording layer is superposed on the reflective layer) and data can be recorded by various methods. Although a recordable optical disc does not generally have a series of pits for data on a base, it has a groove or a series of pits for addresses.

As described above, the optical discs according to the embodiments have substantially loose restrictions on an area where the minute IC memory chip and the antenna coil are provided, so that it becomes easy to design or manufacture the optical disc and it is possible to improve the reliability or to reduce the manufacturing cost.

The loose restrictions on the area allows a large antenna coil (with respect to the radius or the number of turns) to be formed and, therefore, it is possible to improve the communication efficiency and power efficiency and to process a lot of data at high speed. The loose restriction on the thickness allows the antenna coil to be farther from the reflective film (metal), thus increasing the number of options of, for example, choosing a material of the antenna coil. This contributes to an improvement in the reliability, a reduction in the manufacturing cost, and an improvement in the communication efficiency and the power efficiency.

What is claimed is:

1. An optical disc comprising:
   a base having a signal reading surface at a first surface;
   a reflective layer provided on the signal reading surface of the base;
   a cover layer provided on the reflective layer; and
   an IC memory device having a communication function provided at a side of the disc opposing the signal reading surface of the base, and located at a position thereon corresponding to a signal recording area of the base.

2. The optical disc according to claim 1, wherein the IC memory device has an antenna coil.

3. The optical disc according to claim 2, wherein at least one of the IC memory device and the antenna coil is embedded inside the base.

4. The optical disc according to claim 2, wherein the IC memory device is embedded inside the base and the antenna coil is mounted on a second surface opposing the first surface of the base.

5. An optical disc comprising:
   a base having a signal reading surface at a first surface;
   a reflective layer provided on the signal reading surface of the base;
   a cover layer provided on the reflective layer;
   a label having an IC memory device having a communication function, the label being adhered to a side of the disc opposing the signal reading surface of the base.

6. The optical disc according to claim 5, wherein the IC memory device has an antenna coil.

7. The optical disc according to claim 6, further comprising:
   a high-permeability sheet that corresponds to the area of the antenna coil and that is sandwiched between the label and the base.

8. The optical disc according to claim 6, wherein at least part of the base is formed of a high-permeability material.

9. The optical disc according to claim 6, wherein at least one of the IC memory device and the antenna coil is provided in the label.

10. An optical disc comprising:
    a base having a signal receiving surface;
    a reflective layer provided on the signal receiving surface of the base;
    a cover layer provided on the reflective layer;
    an IC memory device having a communication function provided at a side of the disc opposing the signal reading surface of the base; and
    a label adhered to said side of the disc;
    wherein the IC memory device has an antenna coil and the IC memory device is embedded inside the base and the antenna coil is provided in the label.

11. The optical disc according to claim 1, wherein the reflective layer includes a signal-writable recording film.

* * * * *